United States Patent [19]

Chandrasekaran

[11] Patent Number: 4,469,854

[45] Date of Patent: Sep. 4, 1984

[54] CUPRIC SALTS USED IN REDOX POLYMERIZATION OF ETHYLENE CHLOROTRIFLUOROETHYLENE COPOLYMER

[75] Inventor: Swayambu Chandrasekaran, Mountain Lakes, N.J.

[73] Assignee: Allied Corporation, Morris Township, Morris County, N.J.

[21] Appl. No.: 330,120

[22] Filed: Dec. 14, 1981

[51] Int. Cl.$^3$ .................... C08F 210/02; C08F 214/04
[52] U.S. Cl. ...................................... 526/91; 526/249
[58] Field of Search ................................. 526/91, 249

[56] References Cited

U.S. PATENT DOCUMENTS

| | | | |
|---|---|---|---|
| 2,569,524 | 10/1951 | Hamilton | 526/91 |
| 2,613,202 | 10/1952 | Roedel | 526/91 |
| 2,783,219 | 2/1957 | Passino et al. | 260/92.1 |
| 2,820,026 | 1/1958 | Passino et al. | 526/91 |
| 3,414,547 | 12/1968 | Thompson et al. | 260/78.5 |
| 3,767,634 | 10/1973 | Scoggins | 526/249 |

OTHER PUBLICATIONS

Handbook of Chemistry & Physics, 43rd Edt., pp. 568–575, 1962.
"Tracer Studies of Oxidation-Reduction Polymerization and Molecular Weight of 'Teflon' Tetrafluoroethylene Resin", by K. L. Berry & J. H. Peterson.
"The Polymerisation of Vinyl Compounds by the Sulphite Radical", by B. Dudley Sully.
"Kinetics and Mechanism of Oxidations by Peroxydisulfate", by D. A. House.

*Primary Examiner*—Harry Wong, Jr.
*Attorney, Agent, or Firm*—Richard A. Negin; Patrick L. Henry

[57] ABSTRACT

The present invention is an improved process for the aqueous copolymerization of ethylene and chlorotrifluoroethylene in the presence of a catalyst. The catalyst comprises an oxidizing agent and a reducing agent with a sufficient amount of a water soluble buffer compound to maintain the pH from above 7 to about 10. The improvement comprises the addition of from 0.1 to 10 parts per million preferably 1 to 10 parts per million by weight of a cupric cation based on the weight of the aqueous medium.

20 Claims, 1 Drawing Figure

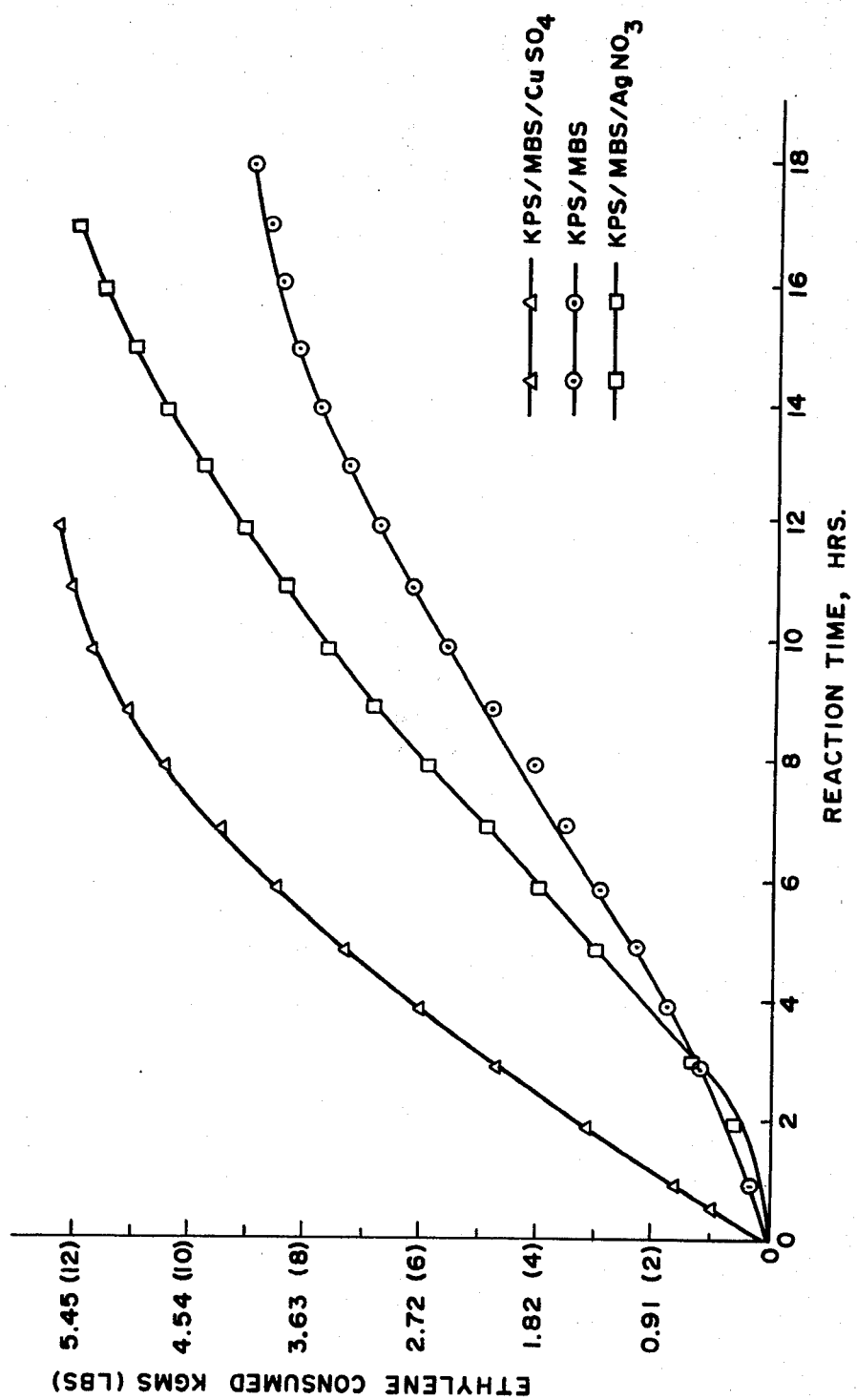

CUPRIC SALTS USED IN REDOX POLYMERIZATION OF ETHYLENE CHLOROTRIFLUOROETHYLENE COPOLYMER

DESCRIPTION

Background of the Invention

This invention relates to the preparation of copolymers of ethylene and chlorotrifluoroethylene.

The preparation of copolymers of ethylene and chlorotrifluoroethylene using redox catalysts is well known in the art. By redox catalyst is meant a catalyst system which includes an oxidizing agent and a reducing agent.

U.S. Pat. No. 3,767,634 discloses a process of copolymerizing chlorotrifluoroethylene and ethylene using a redox catalyst system wherein there is a sufficient amount of a water soluble buffer compound to maintain the pH above 7 to about 12.

The polymerization of trifluorochloroethylene using a redox catalyst system with the addition of various specific metal ions is known. U.S. Pat. Nos. 2,569,524 and 2,783,219 disclose the polymerization of trifluorochloroethylene using a redox catalyst system with a silver salt as an accelerator. U.S. Pat. No. 2,689,241 discloses that certain fluoro olefins especially chlorotrifluoroethylene can be polymerized using a redox catalyst system and an iron salt as an accelerator.

It is also known to use iron salts as accelerators in the redox polymerization of polytetrafluoroethylene. This has been disclosed by Berry et al., *Tracer Studies of Oxidation-Reduction Polymerization and Molecular Weight of "Teflon" Tetrafluoroethylene Resin*, J. Amer. Chem. Soc. pp. 5195-5197, November 1951.

Sully, *The Polymerization of Vinyl Compounds by the Sulphite Radical*, J. Chem. Soc., pp. 1498-1505, 1950, discloses the polymerization of styrene in an emulsion by means of monothionic acid radicals generated by the oxidation of sodium sulfite in the aqueous phase. The polymerization is catalyzed by the presence of traces of copper.

SUMMARY OF THE INVENTION

The present invention is an improved process for the aqueous copolymerization of ethylene and chlorotrifluoroethylene in the presence of a catalyst. The catalyst comprises an oxidizing agent and a reducing agent with a sufficient amount of a water soluble buffer compound to maintain the pH from above 7 to about 10. The improvement comprises the addition of from 0.1 to 10 parts per million preferably 1 to 10 parts per million by weight of a cupric cation. The parts per million by weight of cupric ion is based on the weight of the aqueous medium, including water and any additional solvents such as alcohols, i.e. methanol.

BRIEF DESCRIPTION OF THE DRAWING

The FIGURE is a graph of the polymerization rate of ethylene chlorotrifluoroethylene using different catalyst systems. The polymerization rate is shown in kilograms (pounds) of ethylene consumed over a given reaction time in hours.

DESCRIPTION OF THE PREFERRED EMBODIMENTS

The present invention is an improvement in a process to copolymerize ethylene and chlorotrifluoroethylene using a redox catalyst system with a sufficient amount of a water soluble buffer compound to maintain the pH from above 7 to about 10 and preferably from above 7 to about 9. The improvement of the present invention is the addition to the catalyst of from at least 0.1, preferably 0.1 to 10, and more preferably 1 to 10 parts per million by weight of a cupric cation, based on the weight of the aqueous medium, including water and additional solvents such as alcohol. Although more than 10 parts per million of cupric cation by weight of the aqueous medium can be used, it is preferred to use not more than 10 parts per million since the presence of copper in the copolymer formed by the process of the invention adversely affects its thermal stability, including the processing stability. Excess copper results in discoloration and bubble formation during processing of ethylene chlorotrifluoroethylene copolymer.

The present invention is a process for the copolymerization of ethylene and chlorotrifluoroethylene which comprises contacting a mixture of ethylene and chlorotrifluoroethylene wherein the ethylene comprises 5 to 95 weight percent of the copolymer with the remainder being chlorotrifluoroethylene in an aqueous polymerization system in the presence of a catalyst. The catalyst comprises an oxidizing agent, a reducing agent, a sufficient amount of water soluble buffer compound to maintain the pH above 7 to about 10, and from 0.1 to 10 parts per million by weight of a cupric cation.

The cupric cation is supplied by a water soluble cupric salt. Preferably the cupric salt is inorganic. Preferred cupric salts include but are not limited to cupric chloride, cupric nitrate, cupric sulfate, cupric bromide, cupric dichromate, and cupric fluoride.

The co polymers produced according to the process of the present invention are high molecular weight, thermoplastic polymers containing from 20 to about 80 mol percent, preferably 40 to 60 and more preferably 45 to 55 mol percent ethylene units in the copolymer. Preferably, the copolymer is solid and has a melting point between about 120° C. to 265° C., preferably 200° C. and 265° C.

A small amount, e.g. up to 10 mol percent but usually 0.1 to 5 mole percent based on the ethylene plus chlorotrifluoroethylene, of other copolymerizable monomers can be present in the copolymers of the present invention. Examples of such third monomers include hexafluoroisobutylene, isobutylene, propylene, 1-butene, trifluoroethylene, 1,1-difluoroethylene, and perfluoro(alkyl vinyl ethyl).

The reaction conditions can be varied depending on the extent of polymerization and the final product composition which is desired. In general, the temperatures range from between about 0° C. to about 250° C., preferably from 0° to about 150° C., more preferably from about 5° C. to about 60° C., and most preferably from about 5° to 30° C.

The pressure under which the reaction is conducted is from about 137.8 to 10335.0 kPa (20 to about 1,500 pounds per square inch gauge (psig)), preferably from about 6.9 to 3445 kPa (100 to about 500 psig), and more preferably from about 1033.5 to 2401.5 kPa (150 to 350 psig). Preferably the temperatures and pressures should be coordinated to maintain the chlorotrifluoroethylene and water in a liquid state. The catalyst used in the process of the present invention is a redox catalyst system employed in an aqueous system. The redox system comprises an oxidizing agent and a reducing agent. The oxidizing agents can include inorganic peroxides of the type disclosed in U.S. Pat. No. 2,689,241, hereby incorporated by reference. These include water soluble inorganic peroxides such as perchlorates, perborates, persulfates, perphosphates, percarbonates, barium peroxide, zinc peroxide, and hydrogen peroxide. Particular examples include, sodium, potassium, calcium, barium and ammonium salts of persulfuric acid and perphosphoric acids. The preferred oxidizing agents include the following water soluble peroxide compounds. Alkali metal and alkaline earth metal water soluble salts of persulfuric acid such as the salts of sodium, potassium, barium, and the ammonia salts of persulfuric acid. The preferred salts are ammonium persulfate (($NH_4$)$_2S_2O_8$) and potassium persulfate ($K_2S_2O_8$). Potassium persulfate is the most preferred oxidizing agent. Ammonium persulfate and potassium persulfate are preferred because of their high activity at low temperature, availability, and low cost.

The amount of oxidizing agent employed is generally about 0.05 to 10, preferably 0.1 to 5 and more preferably 0.1 to 1 parts by weight based on 100 parts of chlorotrifluoroethylene monomer.

The reducing agents include sodium formaldehyde sulfoxylate, and ammonium and alkali metal sulfur containing salts such as the sulfites, thiosulfates, bisulfites, hydrosulfites of ammonia, sodium, potassium, rubidium, and cesium. Of these, the sodium and potassium salts are generally preferred because of good activity and lower cost. Most preferred is sodium bisulfite ($NaHSO_3$) and sodium metabisulfite ($Na_2S_2O_5$).

The amount of reducing agent employed is generally about 0.05 to 10, preferably 0.1 to 5 and more preferably 0.1 to 1 parts by weight based on 100 parts of chlorotrifluoroethylene monomer.

The time of polymerization depends upon the copolymer to be polymerized. The polymerization continues until the desired copolymer is formed. In general polymerization times of from about 10 minutes and about 72 hours may be employed. A preferred polymerization time is between about 5 and 50 hours, more preferably between 5 and 20 hours.

The amount of water employed in the process will be sufficient to maintain an aqueous suspension of the reactant monomers and catalyst system. It is preferred to use from 25 to about 750 and more preferably 100 to 500, and most preferably 100 to 300 parts by weight of water per 100 parts by weight of chlorotrifluoroethylene monomer charged to reaction zone. The water is preferably deionized or distilled water.

The pH of the reacting mixture in the process of the present invention is from above 7 to about 10 and preferably from above 7 to 9. The buffer employed in the catalyst system may be any water soluble compound which in the presence of the redox catalyst system maintains the pH of the mixture within the noted limits. Examples of suitable buffers include sodium carbonate, sodium acetate, disodium phosphate, sodium citrate, sodium benzoate, sodium tartrate, sodium bicarbonate, ammonium hydroxide, and borax (sodium tetraborate decahydrate). In the preferred process of the present invention borax is the buffer. There should be sufficient concentration of borax to obtain the desired pH value in the reacting system. It has been found that a preferred amount of borax is 0.5 to 2.0 parts by weight per 100 parts by weight of the aqueous medium.

Various other additives can be added to the reacting materials in the process of the present invention. Additives can be added which help control the molecular weight of the copolymer being produced. A preferred additive is chloroform.

The polymer can easily be separated from the aqueous reaction medium by filtration or centrifugation. Potassium chloride is an electrolyte which can be added to the reaction prior to the addition of the monomers to assure that the reaction product, the copolymer, does not form a fine emulsion in water but rather remains as a filterable suspension. Other easily ionizable electrolytes such as metal salts can be used. Although potassium chloride is preferred, other suitable electrolytes include: metal chlorides, sulfates, nitrates. Cations other than potassium which can be used include metals such as sodium and calcium, and ammonium. There should be from 0.5 to 5, preferably 0.5 to 1.5 parts of the electrolyte per 100 parts by weight of the aqueous medium.

The addition of a suitable agent to coagulate the polymer as discrete particles after the reaction has been completed can be used to aid the filtration operation. If an electrolyte is not used during the reaction, coagulating agents such as potassium chloride, calcium nitrate, calcium carbonate, as well as the same materials used as electrolytes an be used. The amount of coagulating agents used is an amount sufficient to coagulate the polymer. Excessive amounts should be avoided to prevent contamination of the copolymer product.

It has been found that freezing point depressants are also useful. Methanol, for example, is preferably added to act as an antifreeze in order to prevent freezing of the reacting mixture on the reaction walls adjoining the cooling jacket of the reactor.

it has been found that upon venting of the reactor the chlorotrifluoroethylene tends to vaporize. The vaporization causes foaming to occur. It is preferred to use an antifoaming agent. The most preferred antifoaming agent is 1,1,2-trifluoro-1,2,2-trichloroethane.

Briefly, the copolymerization process of the present invention proceeds in a sealed reactor in several basic steps. In the first step the oxidizing agent and the buffer are added. These compounds can be added alone followed by water or added with the water. At this time it is preferred to purge and evacuate the atmosphere above the ingredients added in this first step. Optional additives such as molecular weight regulators, antifreeze, anticoagulants, and antifoaming agents can be added in the first step. In the second step, the chlorotrifluoroethylene should be added to the reactor. Ethylene is immediately introduced to bring the reactor to the desired operating pressure. In the third step, the reducing agent is added, preferably in a water solution. Preferably an initial amount of reducing agent is added with the balance of the reducing agent continually added as the reaction progresses. Additionally, the reactor should be maintained at the desired operating pressure by the continuous addition of ethylene. In the final step, the reaction is stopped by venting unreacted monomer from the reactor and collecting the copolymer.

The cupric ion can be added at anytime during the process of the present invention. The cupric ion can be added with oxidizing agents and buffer. However, the cupric cation is preferably added at the same time as the reducing agent, and more preferably with the reducing agent. This affords better control over the whole course of the reaction. Where part of the reducing agent is added at one time and the balance continually added, a corresponding proportion of the cupric cation is added with the initial amount of reducing agent, and the balance of the cupric cation is added with the balance of the reducing agent. This assures an even and controlled reaction rate.

In the preferred process the charge to the reactor initially contains deionized water, the oxidizing agent, the buffer, and the electrolyte. The reactor is sealed and preferably purged with an inert gas such as nitrogen. A vacuum is then created. At this time, the antifoaming agent, molecular weight controlling additives and methanol can be added to the reactor. After this the chlorotrifluoroethylene is charged to the reactor, followed by enough ethylene to bring the reactor to the operating pressure. A solution of the reducing agent in water is then pumped into the reactor. As the reaction proceeds, additional amounts of the water solution of the reducing agent can be added, as well as sufficient ethylene to maintain the reactor at the desired operating pressure. The cupric cation is added with the reducing agent. The conditions under which the reaction proceeds are discussed above.

EXAMPLES

The difference in the rates of copolymerization of chlorotrifluoroethylene and ethylene using a potassium persulfate-sodium metabisulfite redox initiator in the absence of and in the presence of cupric sulfate is illustrated in the following Examples and Comparatives.

EXAMPLE 1

To a 0.114 m$^3$ (30-gallon) glass-lined steel autoclave was charged 0.064 m$^3$ (17 gallons) of deionized water, 225 grams of potassium persulfate, 454 grams potassium chloride and 650 grams of borax. The reactor was sealed tight, purged five times with nitrogen at 344.5 kPa (50 psig), then evacuated to 94.9 kPa (28 inches Hg.) vacuum. A solution of 0.0057 m$^3$ (1.5 gallons) of 1,1,2-trifluoro-1,2,2-trichloroethane, 185 cupric centimeters (cc) of chloroform and 0.018 m$^3$ (5.0 gallons) of methanol was then charged into the reactor. Seventy-five pounds (34.05 kgm) of chlorotrifluoroethylene were then charged to the reactor followed by enough ethylene to bring total reactor pressure to 1171.3 kPa (170 psig) at 20° C. and 275 rpm agitator speed. A solution of 50 grams of sodium metabisulfite plus 0.18 grams cupric sulfate ($CuSO_4.5H_2O$) in 715 cc water was now pumped into the reactor. After one hour, a solution of sodium metabisulfite and cupric sulfate in water was pumped continuously into the reactor throughout the duration of the run at the rate of 100 cubic centimeters of solution/hr. This solution contained 7 grams sodium metabisulfite plus 0.025 gm. cupric sulfate per 100 cubic centimeters of solution. The reactor was maintained at 1171.3 kPa (170 psig) by the continuous addition of ethylene. The reaction was stopped after 12 hours by venting unreacted monomers from the reactor. Eighty-four pounds (38.14 kgms) of polymer were obtained corresponding to 90 percent conversion of monomer to polymer. The rate of reaction as a function of reaction time during the run is shown in the Figure. The total amount of $CuSO_4.5H_2O$ used in this run corresponds to 6.6 ppm based on the aqueous medium (water and methanol) which is equivalent to about 1.8 ppm cupric ion. The pH of the aqueous phase at the end of the reaction was 8.0.

COMPARATIVE 1

Example 1 was repeated except that the copper sulfate was replaced by an equivalent weight of silver nitrate. After 17 hrs. reaction time, eighty two pounds (37.32 kgms) of polymer was obtained corresponding to 86 percent conversion of monomer to polymer. The rate of reaction as a function of reaction time is shown in the Figure.

COMPARATIVE 2

Example 1 was repeated except that the copper sulfate was replaced by an equivalent weight of a soluble ferrous salt prepared by reacting $FeSO_4.7H_2O$ with sodium pyrophosphate. After 20 hrs. reaction time, 18 pounds (8.172 kg) of polymer were obtained corresponding to 19 percent conversion of monomer to polymer.

COMPARATIVE 3

Example 1 was repeated with the exception that no borax was added to the reactor. After 18.5 hrs. reaction, a total of 12.6 pounds (5.72 kgm) of polymer was obtained, corresponding to about 14 percent conversion of monomer to polymer. The pH of the aqueous phase at the end of the reaction was 3.5.

COMPARATIVE 4

To a 0.114 m$^3$ (30-gallon), glass-lined steel autoclave was charged 0.061 m$^3$ (16 gallons) of deionized water, 225 grams of potassium persulfate, 454 grams of potassium chloride and 681 grams of borax. The reactor was sealed tight, purged five times with nitrogen at 344.5 kPa (50 psig) then evacuated to 94.9 kPa (28 inches Hg.) vacuum. A solution of 0.0057 m$^3$ (1.5 gallons) of 1,1,2-trifluoro-1,2,2-trichloroethane, 185 cc chloroform and (0.015 m$^3$) 4.0 gallons methanol was then charged into the reactor. Seventy-five pounds (34.05 kgm) of chlorotrifluoroethylene were then charged into the reactor followed by enough ethylene to bring total reactor pressure to 1171.3 kPa (170 psig) at 20° C. and 275 rpm agitator speed. A solution of 50 grams of sodium metabisulfite in 715 cc water was now pumped into the reactor. After one hour, a 7 percent water-solution of sodium metabisulfite was continuously pumped into the reactor throughout the duration of the run at the rate of 100 cc/hr. (corresponding to 7 gms./hr. of continuous injection of sodium metabisulfite). The reactor was maintained at 1171.3 kPa (170 psig) by continuous addition of ethylene. The reaction was stopped after 18 hours by venting unreacted monomers from the reactor. Sixty-three pounds (28.60 kgm) of polymer were obtained corresponding to 67.7 percent conversion of monomer to polymer. The rate of reaction as a function of reaction time during the run is shown in the Figure. The pH or reactor effluent at the end of run was 7.9.

EXAMPLE 2

Example 1 was repeated except for the amount of $CuSO_4.5H_2O$ added with the initial and continuous catalyst injection streams. Initially 0.09 grams of $CuSO_4.5H_2O$ were pumped into the reactor together with 50 grams of sodium metabisulfite, then 100 cubic centimeter per hour of a solution containing 7 grams sodium metabisulfite plus 0.0125 grams of cupric sulfate were continuously pumped in. The reaction was stopped after 5.25 hours to yield 23.154 kgms (51 pounds) of polymer. The rate of reaction in this run was compared to the rate in the run of Example 1 and found to be almost identical. The total amount of $CuSO_4.5H_2O$ used in this run corresponds to 2.2 ppm based on the aqueous phase (water plus methanol) which corresponds to about 0.6 ppm cupric ion. The pH of the aqueous phase at the end of the reaction was 8.2.

EXAMPLE 3

Example 2 was repeated with the exception that the reaction temperature was 10° C. instead of 20° C. After 5 hrs. reaction, a total of 18.16 kgms (40 pounds) of polymer were obtained corresponding to 43 percent conversion of monomer to polymer.

COMPARATIVE 5

Example 3 was repeated except that no copper sulfate was used in the reaction. After 5 hrs. reaction, a total 5.61 kgms (12.8 pounds) of polymer were obtained corresponding to about 14 percent conversion of monomer to polymer.

EXAMPLE 6

A 0.0114 m$^3$ (3-gallon), glass-lined steel autoclave was charged with 6 liters of deionized water, 17 grams of potassium persulfate, 70 grams KCl, 4 cc chloroform and 50 grams borax. The reactor was sealed, purged three times with 344.5 kPa (50 psig) nitrogen, evacuated and charged with 1.36 kgms (3 pounds) of chlorotrifluoroethylene. The reactor temperature was raised to 40° C. and the reactor pressurized with ethylene to a total pressure of 300 psig. A solution of 3 grams of sodium metabisulfite and 0.006 grams of CuSO$_4$.5H$_2$O in 300 cubic centimeter of water was then pumped in. After 1 hr., a solution containing one gram sodium metabisulfite and 0.002 grams CuSO$_4$.5H$_2$O in 100 cc water was continuously pumped into the reactor at the rate of 100 cc/hr. After 3.5 hours of reaction, a total of 656 grams of polymer were obtained corresponding to 38 percent conversion of monomer to polymer. The pH of the aqueous phase was 7.6.

COMPARATIVE 6

Example 6 was repeated without CuSO$_4$.5H$_2$O. After 3.5 hrs. reaction, a total of 337 grams of polymer were obtained corresponding to 24 percent conversion of monomer to polymer. The pH of the aqueous phase was 7.8.

While exemplary embodiments of this invention have been described, the true scope of the invention is to be determined from the following claims.

What is claimed is:

1. An improved process for the aqueous copolymerization of ethylene and chlorotrifluoroethylene, to produce a copolymer containing 20 to 80 mol percent ethylene, in the presence of a catalyst, comprising an oxidizing agent and a reducing agent, with a sufficient amount of water soluble buffer compound to maintain the pH from above 7 to about 10; wherein the improvement is the catalyst further comprising from 0.1 to 10 parts per million by weight of a cupric cation, supplied in the form of a water soluble cupric salt, based on the weight of the aqueous medium.

2. The process as recited in claim 1 wherein the oxidizing agent is a water soluble alkali metal or alkaline earth metal salt of persulfuric acid or an ammonium salt of persulfuric acid.

3. The process as recited in claim 2 wherein the oxidizing agent is potassium persulfate.

4. The process as recited in claim 1 wherein the reducing agent is selected from the group consisting of ammonium or alkali metal sulfites, thiosulfites, thiosulfates, bisulfites, hydrosulfites, and formaldehyde sulfoxylate.

5. The process as recited in claim 4 wherein the reducing agent is sodium metabisulfite or sodium bisulfite.

6. The process as recited in claim 4 wherein the cupric salt is cupric sulfate.

7. The process as recited in claim 1 wherein the pH is maintained from above 7 to about 9.

8. The process as recited in claim 1 wherein the cupric cation is supplied by a water soluble cupric salt.

9. The process as recited in claim 8 wherein the cupric salt is inorganic.

10. The process as recited in claim 1 wherein the cupric salt is selected from the group consisting of cupric chloride, cupric nitrate, cupric sulfate, cupric bromide, cupric dichromate, and cupric fluoride.

11. The process as recited in claim 1 wherein there is 1 to 10 parts per million of the cupric cation based on the weight of the aqueous medium.

12. The process as recited in claim 1 wherein there are from 100 to 500 parts by weight of water per 100 parts of chlorotrifluoroethylene monomer.

13. A process for the copolymerization of ethylene and chlorotrifluoroethylene which comprises contacting a mixture of ethylene and chlorotrifluoroethylene wherein the ethylene comprises 5 to 95 weight percent of the copolymer with the remainder being chlorotrifluoroethylene in an aqueous polymerization system in the presence of a catalyst comprising:
   (a) an oxidizing agent which is a water soluble alkali metal or alkaline earth metal salt of persulfuric acid or an ammonium salt of persulfuric acid; and
   (b) a reducing agent which is ammonium or alkali metal sulfites, thiosulfites, thiosulfates, bisulfites, hydrosulfites, a formaldehyde sulfoxylate; with
   (c) a sufficient amount of water soluble buffer compound to maintain the pH above 7 to about 10; and
   (d) from 0.1 to 10 parts per million by weight of a cupric cation supplied in the form of a water soluble cupric salt.

14. The process as recited in claim 13 wherein the cupric cation is supplied by a water soluble metal salt.

15. The process as recited in claim 14 wherein the cupric cation is an inorganic salt selected from the group consisting of cupric chloride, cupric nitrate, cupric sulfate, cupric bromide, cupric dichromate, and cupric fluoride.

16. The process as recited in claim 15 wherein the cupric salt is cupric sulfate.

17. The process as recited in claim 13 wherein the oxidizing agent is potassium persulfate, the reducing agent is sodium metabisulfite, or sodium bisulfite, and the cupric cation is supplied by cupric sulfate.

18. The process of preparing a copolymer of ethylene and chlorotrifluoroethylene, wherein the ethylene comprises 20 to 80 mol percent of the copolymer with the remainder being chlorotrifluoroethylene, which comprises: charging to a sealed reactor an oxidizing agent which is a water soluble alkali metal, alkaline earth metal, or ammonium salt of persulfuric acid and a water soluble buffer compound which is capable of maintaining the pH of the reaction above 7 to about 10; adding to the reaction a sufficient amount of water to support the copolymerization; then adding to the reactor chlorotirfluoroethylene; pressurizing said reactor with ethylene to a pressure of from about 137.8 to 10335.0 kPa (20 to about 1500 psig); and then adding to the reactor from 0.1 to 10 parts per million of a cupric cation based on the weight of the aqueous medium supplied in the form of a water soluble cupric salt and a reducing agent which is an ammonium or alkali metal sulfite, thiosulfite, bisulfite, hydrosulfite, or formaldehyde sulfoxylate, maintaining the temperature of the reactor in the range of from about 0° and 250° C. and continuing the polymerization until said copolymer has been formed.

19. The process as recited in claim 18 wherein the ethylene comprises from 40 to 60 mol percent of the copolymer, the pressure is from 1033.5 kPa to 2401.5 kPa (150 to 350 psig), and the temperature is from 5° C. to 60° C.

20. The process as recited in claim 19 wherein the cupric cation is added with the reducing agent.

* * * * *